US009350521B2

(12) United States Patent
Pan et al.

(10) Patent No.: US 9,350,521 B2
(45) Date of Patent: *May 24, 2016

(54) ADAPTIVE UPLINK/DOWNLINK TIMESLOT ASSIGNMENT IN A HYBRID WIRELESS TIME DIVISION MULTIPLE ACCESS/CODE DIVISION MULTIPLE ACCESS COMMUNICATION SYSTEM

(71) Applicant: InterDigital Technology Corporation, Wilmington, DE (US)

(72) Inventors: Kyle Jung-Lin Pan, Saint James, NY (US); Ariela Zeira, Huntington, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/746,402

(22) Filed: Jun. 22, 2015

(65) Prior Publication Data
US 2015/0288506 A1    Oct. 8, 2015

Related U.S. Application Data

(63) Continuation of application No. 14/337,868, filed on Jul. 22, 2014, now Pat. No. 9,066,341, which is a continuation of application No. 12/348,637, filed on Jan. 5, 2009, now Pat. No. 8,842,644, which is a (Continued)

(51) Int. Cl.
*H04W 72/04*    (2009.01)
*H04L 5/00*    (2006.01)
(Continued)

(52) U.S. Cl.
CPC ............ *H04L 5/0073* (2013.01); *H04B 7/2618*

(2013.01); *H04W 52/143* (2013.01); *H04W 72/042* (2013.01); *H04W 72/0413* (2013.01); *H04W 72/082* (2013.01)

(58) Field of Classification Search
CPC ............ H04L 5/0073; H04W 52/143; H04W 72/042; H04B 7/2618
See application file for complete search history.

(56) References Cited

U.S. PATENT DOCUMENTS 5,148,548 A    9/1992    Meche et al.
5,260,944 A    11/1993    Tomabechi
(Continued)

FOREIGN PATENT DOCUMENTS

DE    19820736    9/1999
EP    0 865 172    9/1998
(Continued)

OTHER PUBLICATIONS

Hara et al., "Time Slot Assignment for Cellular SDMA/TDMA Systems with Antenna Arrays", YRP Mobile Telecommunications Key Technology Research Laboratories Co., Ltd., pp. 1-4.
(Continued)

*Primary Examiner* — Jay P Patel
(74) *Attorney, Agent, or Firm* — Volpe and Koenig, P.C.

(57) ABSTRACT

A method and apparatus for adaptive uplink/downlink resource assignment may include determining uplink interference associated with each of several uplink resources. The method and apparatus may produce an uplink list with values for the uplink resources. The method and apparatus may compare a downlink power level to a threshold for each of the downlink resources and produce a downlink list. The downlink list may be a bit stream providing an indication, for each downlink resource, indicating whether each of the downlink resources have a downlink power level which is less than or equal to the threshold. The method and apparatus may send the uplink and downlink lists. The method and apparatus may receive an uplink list and a downlink list from each of several neighboring wireless network devices. The method and apparatus may schedule uplink and downlink resources to a user equipment based on the uplink and downlink lists received.

12 Claims, 14 Drawing Sheets

Figure 1:
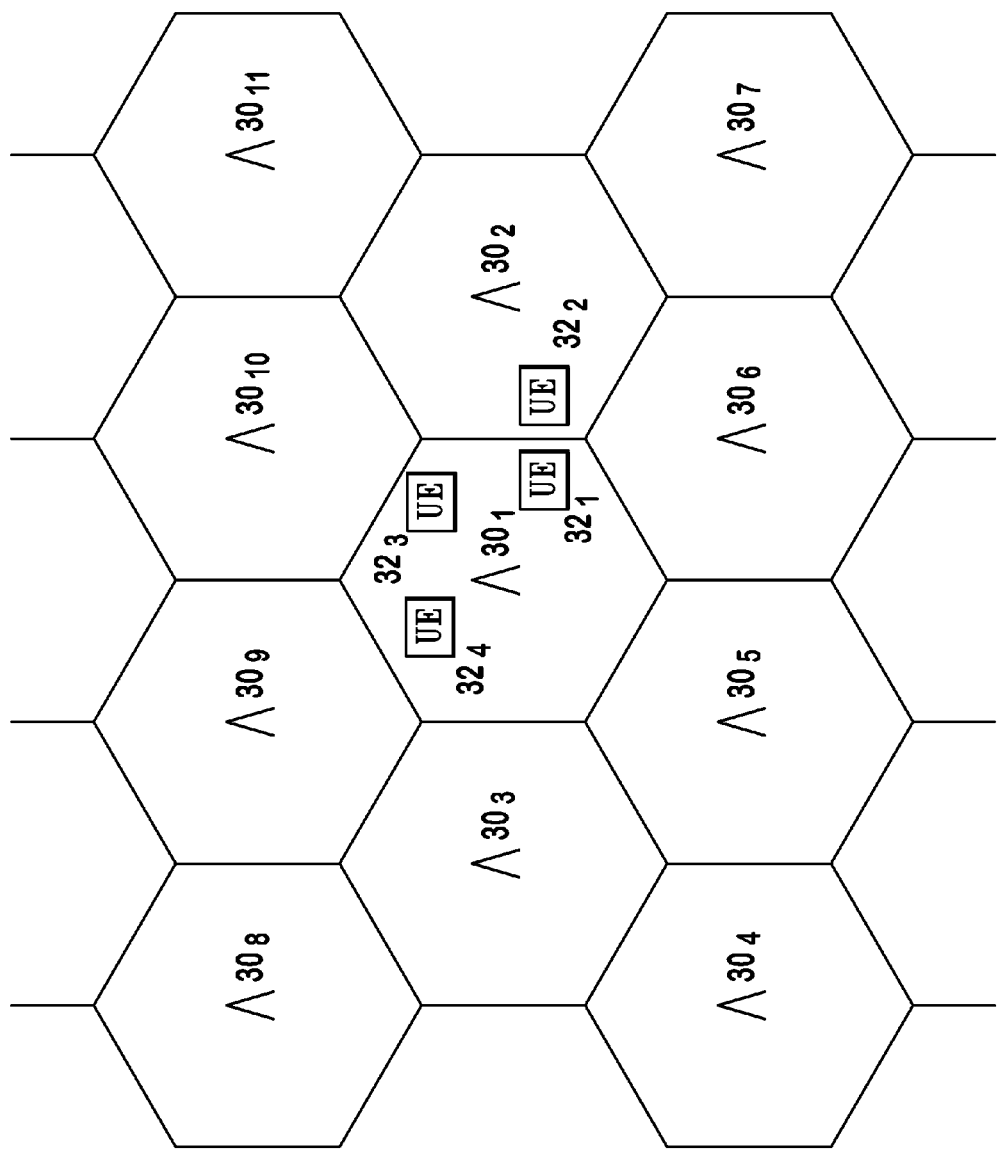

Related U.S. Application Data continuation of application No. 11/347,340, filed on Feb. 3, 2006, now Pat. No. 7,474,644, which is a continuation of application No. 09/910,329, filed on Jul. 20, 2001, now Pat. No. 6,996,078.

(60) Provisional application No. 60/221,009, filed on Jul. 27, 2000.

(51) Int. Cl.
*H04B 7/26* (2006.01)
*H04W 72/08* (2009.01)
*H04W 52/14* (2009.01)

(56) References Cited

U.S. PATENT DOCUMENTS

| | | | |
|---|---|---|---|
| 5,303,234 A | 4/1994 | Kou | |
| 5,455,962 A | 10/1995 | Kotzin | |
| 5,506,848 A | 4/1996 | Drakopoulos et al. | |
| 5,533,013 A | 7/1996 | Leppanen | |
| 5,572,516 A | 11/1996 | Miya et al. | |
| 5,594,720 A | 1/1997 | Papadopoulos et al. | |
| 5,627,880 A | 5/1997 | Rozanski et al. | |
| 5,886,988 A | 3/1999 | Yun et al. | |
| 5,930,262 A | 7/1999 | Sierens et al. | |
| 5,937,002 A | 8/1999 | Andersson et al. | |
| 5,991,622 A | 11/1999 | Henry, Jr. | |
| 6,009,332 A * | 12/1999 | Haartsen | H04W 16/16 455/444 |
| 6,044,249 A | 3/2000 | Chandra et al. | |
| 6,108,321 A | 8/2000 | Anderson et al. | |
| 6,119,011 A | 9/2000 | Borst et al. | |
| 6,134,442 A | 10/2000 | Borst et al. | |
| 6,144,652 A | 11/2000 | Avidor et al. | |
| 6,154,655 A | 11/2000 | Borst et al. | |
| 6,212,386 B1 * | 4/2001 | Briere | H04W 16/18 455/447 |
| 6,240,125 B1 * | 5/2001 | Andersson | H04B 1/715 375/132 |
| 6,298,081 B1 * | 10/2001 | Almgren | H04W 72/0466 375/132 |
| 6,301,233 B1 * | 10/2001 | Ku | H04W 16/10 370/322 |
| 6,334,057 B1 | 12/2001 | Malmgren et al. | |
| 6,453,176 B1 | 9/2002 | Lopes et al. | |
| 6,456,826 B1 * | 9/2002 | Toskala | H04W 52/288 370/350 |
| 6,526,028 B1 * | 2/2003 | Kondo | H04B 1/7103 370/333 |
| 6,542,485 B1 | 4/2003 | Mujtaba | |
| 6,591,108 B1 * | 7/2003 | Herrig | H04W 16/04 370/330 |
| 6,591,109 B2 | 7/2003 | Pan | |
| 6,654,612 B1 | 11/2003 | Avidor et al. | |
| 6,714,523 B2 | 3/2004 | Zeira et al. | |
| 6,744,743 B2 | 6/2004 | Walton et al. | |
| 6,791,961 B2 | 9/2004 | Zeira et al. | |
| 6,792,273 B1 | 9/2004 | Tellinger et al. | |
| 6,801,543 B1 | 10/2004 | Ployer | |
| 6,996,078 B2 * | 2/2006 | Pan | H04B 7/2618 370/329 |
| 7,050,481 B1 * | 5/2006 | Hulbert | H04B 1/7103 370/342 |
| 7,180,877 B1 | 2/2007 | Benveniste | |
| 7,376,104 B2 * | 5/2008 | Diachina | H04W 36/30 370/332 |
| 7,532,888 B2 * | 5/2009 | Kondo | H04B 1/7103 370/332 |
| 2001/0055297 A1 | 12/2001 | Benveniste | |
| 2002/0015393 A1 | 2/2002 | Pan et al. | |
| 2002/0067709 A1 | 6/2002 | Yamada et al. | |
| 2002/0098860 A1 | 7/2002 | Pecen et al. | |
| 2002/0111163 A1 | 8/2002 | Hamabe | |
| 2003/0214918 A1 | 11/2003 | Marinier | |
| 2008/0182609 A1 | 7/2008 | Somasundaram et al. | |
| 2012/0026970 A1 | 2/2012 | Winters et al. | |

FOREIGN PATENT DOCUMENTS

| | | |
|---|---|---|
| EP | 1 087 630 | 3/2001 |
| GB | 2 320 648 | 6/1998 |

OTHER PUBLICATIONS

L. Chen et al., "A dynamic channel assignment algorithm for asymmetric traffic in voice/data integrated TDMA/TDD mobile radio," Information, Communications and Signal Processing, 1997, ICICS., vol. 1, 1997.

L. Ortigoza-Guerrero et al., "Evaluation of channel assignment strategies for TIA IS-54 system," Personal Wireless Communications, 1996., IEEE International Conference on 1996, pp. 168-175.

Milhailescu C. et al., "Dynamic resource allocation for packet transmission in UMTS TDD-CDMA systems," Vehicular Technology Conference, IEEE 49$^{th}$ Houston, TX, May 16-20, 1999., Piscataway, NJ, May 16, 1999, pp. 1737-1741.

Minn et al., "Dynamic Assignment of Orthogonal Variable-Spreading-Factor Codes in W-CDMA", IEEE, 2000, pp. 1429-1439.

Sehun Kim et al., "Optimal time slot assignment in CDMA packet radio networks," Vehicular Technology Conference, 1996. Mobile Technology for the Human Race., IEEE 46$^{th}$ vol. 3, 1996, pp. 1705-1709.

Sourour, "Time Slot Assignment Techniques for TDMA Digital Cellular Systems", IEEE Transactions on Vehicular Technology, vol. 43. No. 1, Feb. 1994, pp. 121-127.

Takanashi et al., "Frequency-Segregated Dynamic Channel Allocation for Asynchronized TDMA/TDD Frame Among Base Stations", IEEE, 1996, pp. 933-937.

\* cited by examiner

FIG. 6

CROSS INTERFERENCE CELL LIST — 84

| CELL | POTENTIAL CROSS INTERFERING CELLS | | | | | | | | | | |
|---|---|---|---|---|---|---|---|---|---|---|---|
| | 1 | 2 | 3 | 4 | 5 | 6 | 7 | 8 | 9 | 10 | 11 |
| 1 | X | I | I | | I | I* | | | I | I | |
| 2 | I | X | | | | I | I | | | I | I |
| 3 | I | | X | I | I* | | | I | I | | |
| 4 | | | I | X | I | | | | | | |
| 5 | I | | I* | I | X | I | | | | | |
| 6 | I* | I | | | I | X | I | | | | |
| 7 | | I | | | | I | X | | | | |
| 8 | | | I | | | | | X | I | | |
| 9 | I | | I | | | | | I | X | I | |
| 10 | I | I | | | | | | | I | X | I |
| 11 | | I | | | | | | | | I | X |

FIG. 7

TIME SLOT ALLOCATION PER CELL — 86

| CELL | TIME SLOT ALLOCATION | | | | | | | | | | | | | | |
|---|---|---|---|---|---|---|---|---|---|---|---|---|---|---|---|
| | S1 | S2 | S3 | S4 | S5 | S6 | S7 | S8 | S9 | S10 | S11 | S12 | S13 | S14 | S15 |
| 1 | | | D | U | | | | | | | | | | | |
| 2 | D | D | | | | | | | U | | | | | | |
| 3 | | | | U | D | | | | | | | | | | |
| 4 | | | | | | | | | | D | D | | | | |
| 5 | | | D | | | | | | | | | | | U | |
| 6 | | | | | | D | | | | | | | | | U |
| 7 | | | | | | | | | | D | | | | | |
| 8 | | | | | | | | | | D | D | | | | |
| 9 | | | | | D | U | | | | | | | | | |
| 10 | | | D | U | | | | | | | | | | | |
| 11 | | | | | | | | | | | D | D | D | D | U |

FIG. 8

AVAILABILITY LIST FOR CELL 1 — 88

| CELL (UPLINK / DOWNLINK) | TIME SLOT AVAILABILITY | | | | | | | | | | | | | | |
|---|---|---|---|---|---|---|---|---|---|---|---|---|---|---|---|
| | S1 | S2 | S3 | S4 | S5 | S6 | S7 | S8 | S9 | S10 | S11 | S12 | S13 | S14 | S15 |
| 1 (UPLINK) | X | X | X | | X | X | | | | | | | | | |
| 1 (DOWNLINK) | | | | X | | X | | X | | | | | | X | X |

BS - BS CROSS INTERFERENCE CELL LIST — 132

| CELL | \multicolumn{11}{c}{POTENTIAL CROSS INTERFERING CELLS} |

| CELL | 1 | 2 | 3 | 4 | 5 | 6 | 7 | 8 | 9 | 10 | 11 |
|---|---|---|---|---|---|---|---|---|---|---|---|
| 1 | X | I | I |   | I |   |   |   | I | I |   |
| 2 | I | X |   |   |   | I | I |   |   | I | I |
| 3 | I |   | X | I |   |   |   | I | I |   |   |
| 4 |   |   | I | X | I |   |   |   |   |   |   |
| 5 | I |   |   | I | X | I |   |   |   |   |   |
| 6 |   | I |   |   | I | X | I |   |   |   |   |
| 7 |   | I |   |   |   | I | X |   |   |   |   |
| 8 |   |   | I |   |   |   |   | X | I |   |   |
| 9 | I | I |   |   |   |   |   | I | X | I |   |
| 10 | I | I |   |   |   |   |   |   | I | X | I |
| 11 |   | I |   |   |   |   |   |   |   | I | X |

FIG. 10

UE - UE CROSS INTERFERENCE CELL LIST — 142

| CELL | 1 | 2 | 3 | 4 | 5 | 6 | 7 | 8 | 9 | 10 | 11 |
|---|---|---|---|---|---|---|---|---|---|---|---|
| 1 | X | I* | I* |   | I* | I* |   |   | I* | I* |   |
| 2 | I* | X |   |   |   | I* | I* |   |   | I* | I* |
| 3 | I* |   | X | I* | I* |   |   |   | I* | I* |   |
| 4 |   |   | I* | X | I* |   |   |   |   |   |   |
| 5 | I* |   | I* | I* | X | I* |   |   |   |   |   |
| 6 | I* | I* |   |   | I* | X | I* |   |   |   |   |
| 7 |   | I* |   |   |   | I* | X |   |   |   |   |
| 8 |   |   | I* |   |   |   |   | X | I* |   |   |
| 9 | I* |   | I* |   |   |   |   | I* | X | I* |   |
| 10 | I* | I* |   |   |   |   |   |   | I* | X | I* |
| 11 |   | I* |   |   |   |   |   |   |   | I* | X |

FIG. 12

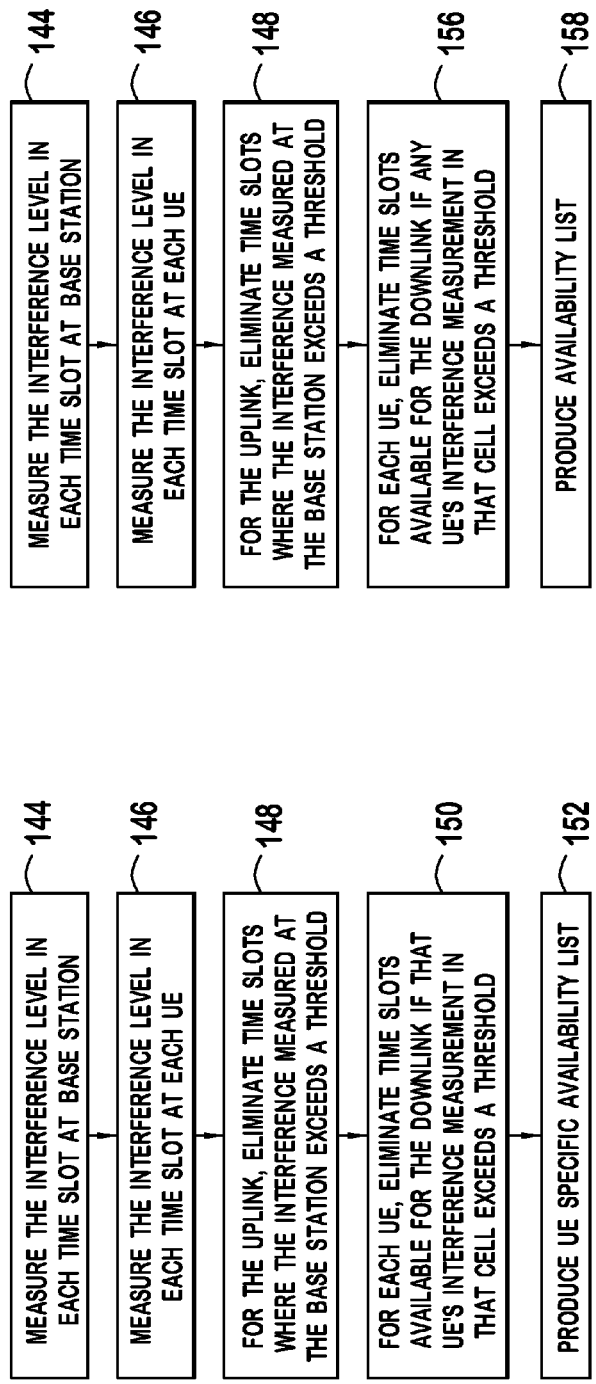

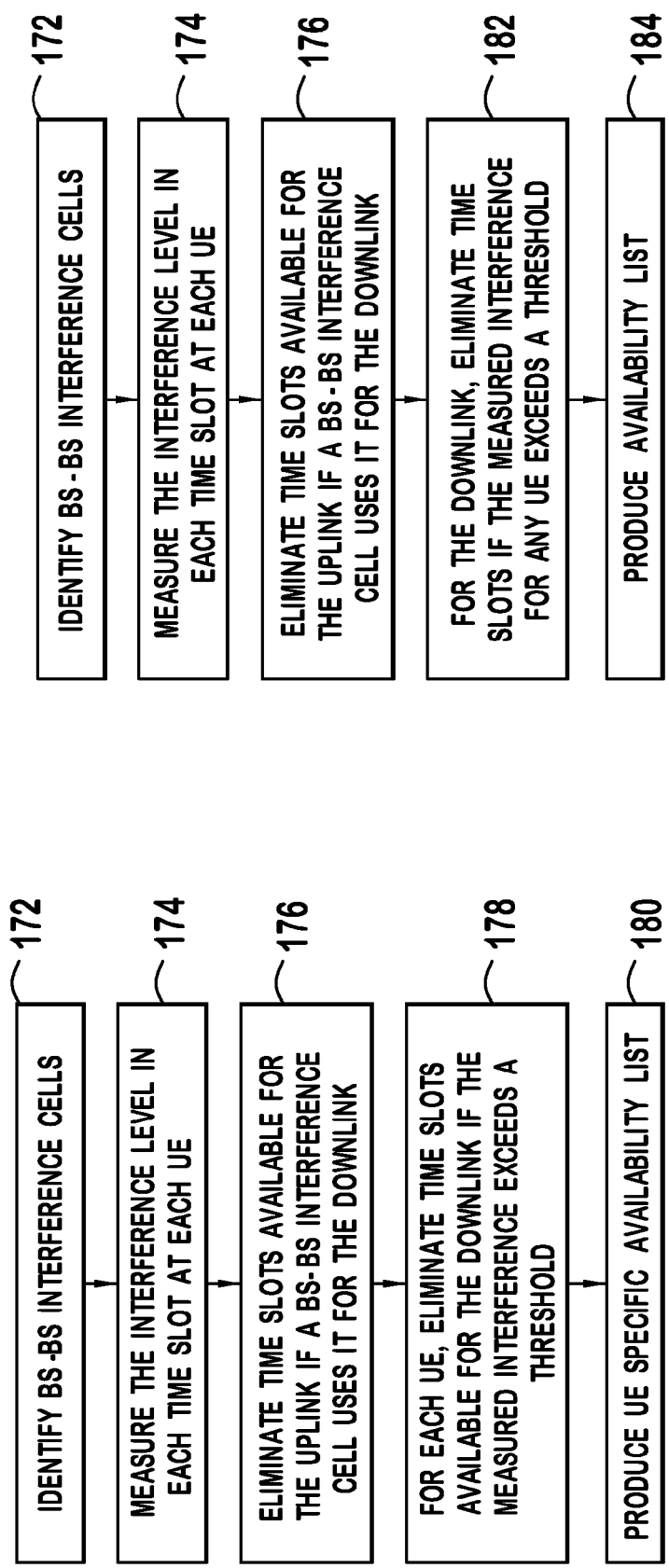

| TIME SLOT ALLOCATION PER CELL | | | | | | | | | | | | | | | | |
|---|---|---|---|---|---|---|---|---|---|---|---|---|---|---|---|---|
| | TIME SLOT ALLOCATION | | | | | | | | | | | | | | | |
| CELL | S1 | S2 | S3 | S4 | S5 | S6 | S7 | S8 | S9 | S10 | S11 | S12 | S13 | S14 | S15 |
| 1 | | | D | U | | | | | | | | | | | |
| 2 | D | D | | | | | | | U | | | | | | |
| 3 | | | | U | D | | | | | | | | | | |
| 4 | | | | | | | | | | D | D | | | | |
| 5 | | | D | | | | | | | | | | | U | |
| 6 | | | | | | D** | D* | U* | | | | | | | U |
| 7 | | | | | | | | | | D | | | | | |
| 8 | | | | | | | | | | D | D | | | | |
| 9 | | | | | | D | U | | | | | | | | |
| 10 | | | D | U | | | | | | | | | | | |
| 11 | | | | | | | | | | D | D | D | D | | U |

FIG. 23

| AVAILABILITY LIST FOR CELL 7 | | | | | | | | | | | | | | | | |
|---|---|---|---|---|---|---|---|---|---|---|---|---|---|---|---|---|
| CELL (UPLINK / DOWNLINK) | TIME SLOT AVAILABILITY | | | | | | | | | | | | | | | |
| | S1 | S2 | S3 | S4 | S5 | S6 | S7 | S8 | S9 | S10 | S11 | S12 | S13 | S14 | S15 |
| 7 (UPLINK) | X | X | | | | R | X* | | | | | | | | |
| 7 (DOWNLINK) | | | | | | | | X* | X | | | | | | X |

FIG. 24

ADAPTIVE UPLINK/DOWNLINK TIMESLOT ASSIGNMENT IN A HYBRID WIRELESS TIME DIVISION MULTIPLE ACCESS/CODE DIVISION MULTIPLE ACCESS COMMUNICATION SYSTEM

CROSS REFERENCE TO RELATED APPLICATIONS

This application is a continuation of U.S. patent application Ser. No. 14/337,868 filed Jul. 22, 2014, which is a continuation of U.S. patent application Ser. No. 12/348,637 filed Jan. 5, 2009, which issued as U.S. Pat. No. 8,842,644 on Sep. 23, 2014, which is a continuation of U.S. patent application Ser. No. 11/347,340 filed Feb. 3, 2006, which issued as U.S. Pat. No. 7,474,644 on Jan. 6, 2009, which is a continuation of U.S. patent application Ser. No. 09/910,329 filed Jul. 20, 2001, which issued as U.S. Pat. No. 6,996,078 on Feb. 7, 2006, which claims the benefit of U.S. Provisional Application Ser. No. 60/221,009 filed Jul. 27, 2000, the contents of which are hereby incorporated by reference herein.

BACKGROUND

The present invention relates generally to resource allocation in wireless hybrid time division multiple access/code division multiple access communication systems. More specifically, the invention relates to assigning uplink and downlink timeslots in such systems.

FIG. 1 depicts a wireless communication system. The system has a plurality of base stations $30_1$-$30_{11}$. Each base station $30_1$ communicates with user equipments (UEs) $32_1$, $32_3$, $32_4$ in its operating area or cell. Communications transmitted from the base station $30_1$ to the UE $32_1$ are referred to as downlink communications and communications transmitted from the UE $32_1$ to the base station $30_1$ are referred to as uplink communications.

Figure 2:
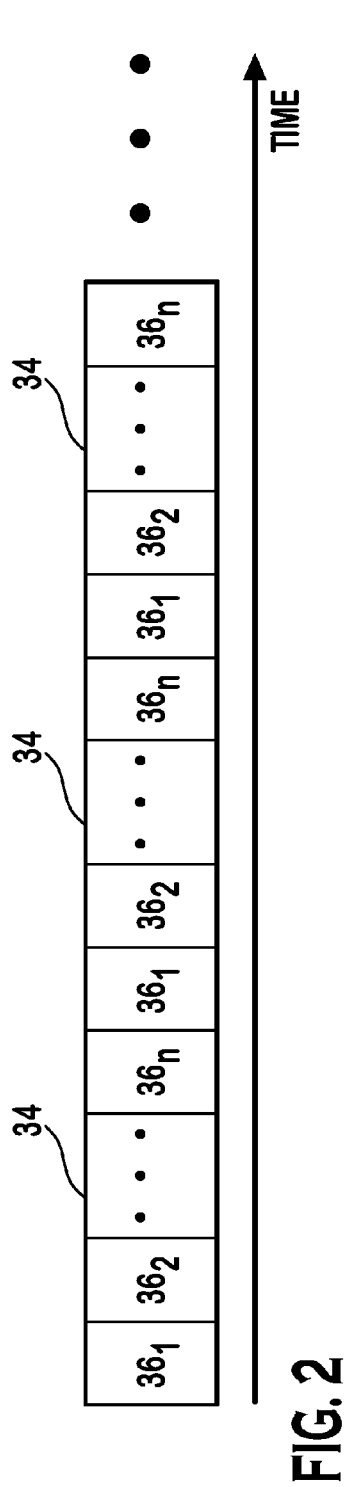

In addition to communicating over different frequency spectrums, spread spectrum code division multiple access (CDMA) systems carry multiple communications over the same spectrum. The multiple signals are distinguished by their respective chip codes (codes). To more efficiently use the spread spectrum, some hybrid time division multiple access (TDMA)/CDMA systems as illustrated in FIG. 2 use repeating frames 34 divided into a number of timeslots $36_1$-$36_n$ such as fifteen timeslots. In time division duplex (TDD) systems using CDMA, a timeslot is used either solely for downlink or uplink communications in a cell. In such systems, a communication is sent in selected timeslots $36_1$-$36_n$ using selected codes. Accordingly, one frame 34 is capable of carrying multiple communications distinguished by both timeslot $36_1$-$36_n$ and code. The use of a single code in a single timeslot with a spreading factor of sixteen is referred to as a resource unit. Based on a communication's bandwidth requirements, one or multiple resource units may be assigned to a communication.

Figure 3:
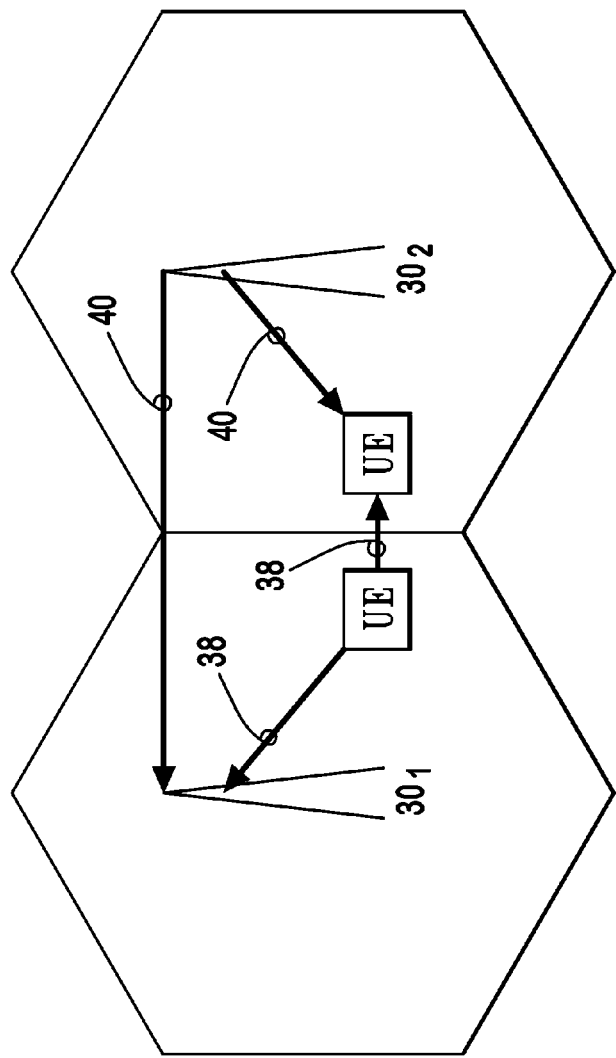

One problem in such systems is cross cell interference as illustrated in FIG. 3. A second cell's base station $30_2$ sends a downlink communication 40 to a second cell's UE $32_2$ in a certain timeslot. In the same timeslot, an uplink communication 38 is sent from a first cell's UE $32_1$. The uplink communication 38 may be received by the first cell's base station $30_1$ at an unacceptable interference level. Although the second cell's base station $30_2$ is further away than the first cell's UE $32_1$, the higher effective isotopically radiate power (EIPR) of the second cell's base station $30_2$ may result in unacceptable interference at the first cell's base station $30_1$.

Also shown in FIG. 3 is cross interference between UEs $32_1$, $32_2$. An uplink signal 38 from a first cell's UE $32_1$ will create unacceptable levels of interference to a downlink communication 40 in the same timeslot received by the second cell's UE $32_2$, due to their close proximity.

Accordingly, there exists a need for reducing cross cell interference.

SUMMARY

A hybrid time division duplex/code division multiple access communication system comprises a radio network controller coupled to a plurality of Node-Bs. The radio network controller comprises a resource allocation device for providing each Node-B with a list of timeslots that the Node-B can use to assign uplink timeslots and downlink timeslots. The list of timeslots does not include all potential timeslots as being assignable for uplink communications and does not include all potential timeslots as being assignable for downlink communications. Each of the plurality of Node-Bs comprises an assignment device for dynamically assigning uplink and downlink communications to users of the Node-B in response to the assignable uplink and downlink timeslots of the list.

BRIEF DESCRIPTION OF THE DRAWING(S)

Figures 4, 5:
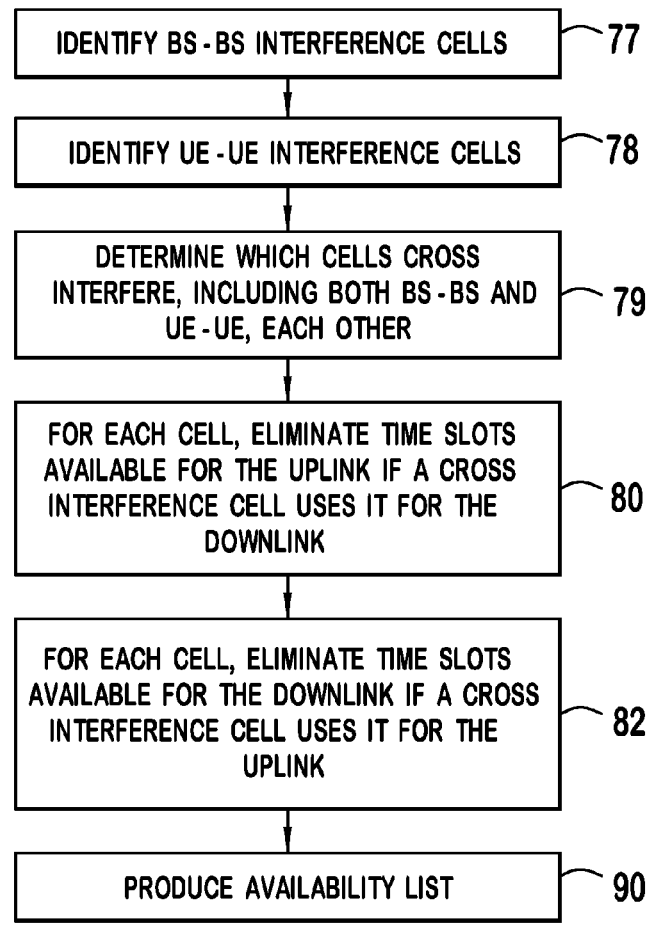
Figure 9:
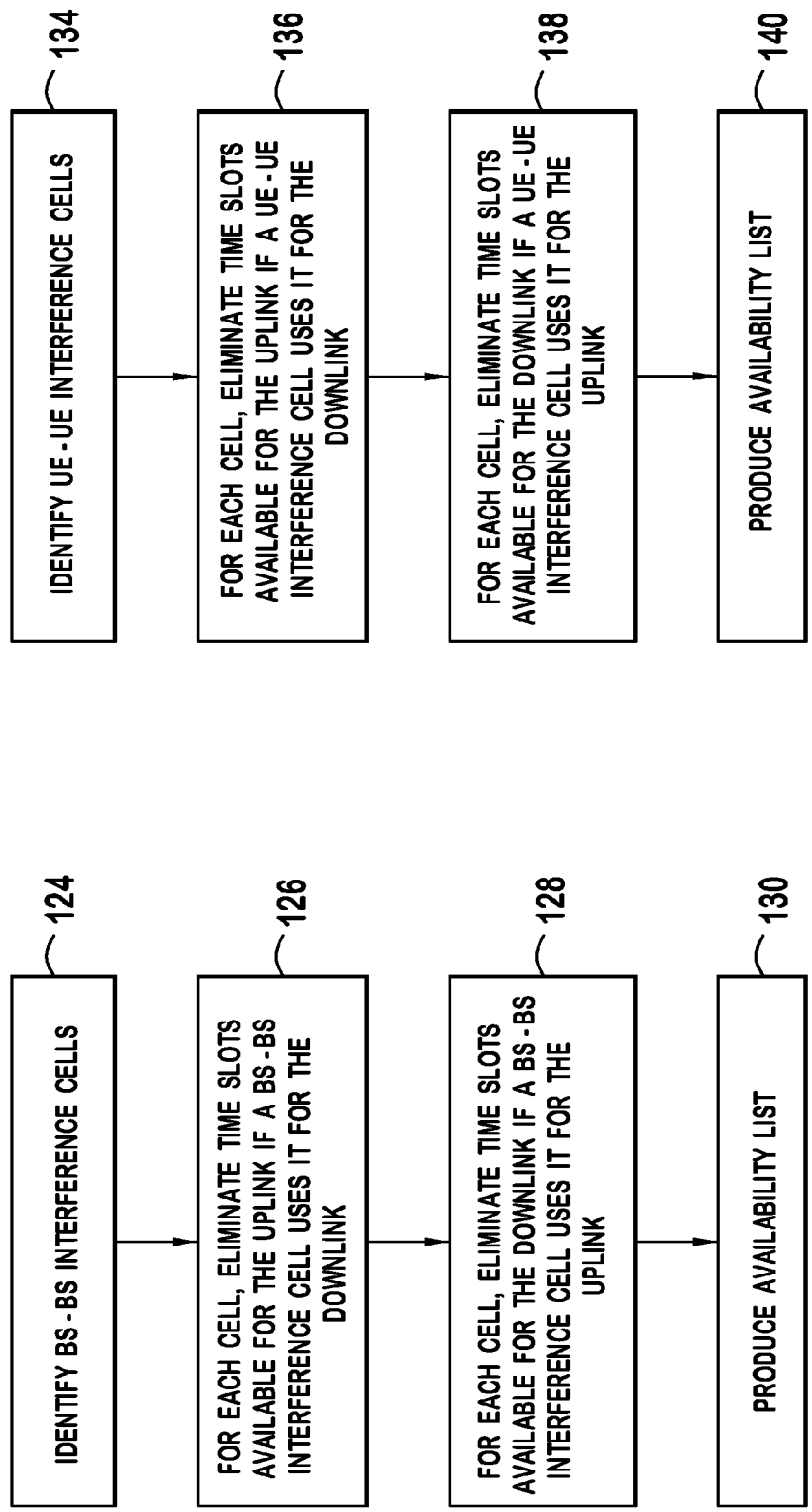
Figure 17:
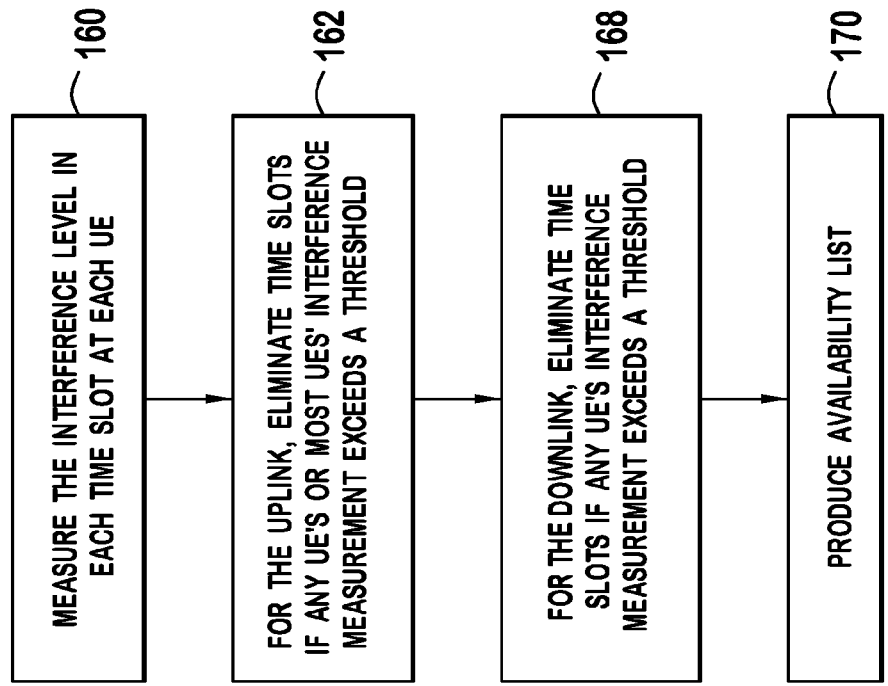
Figure 16:
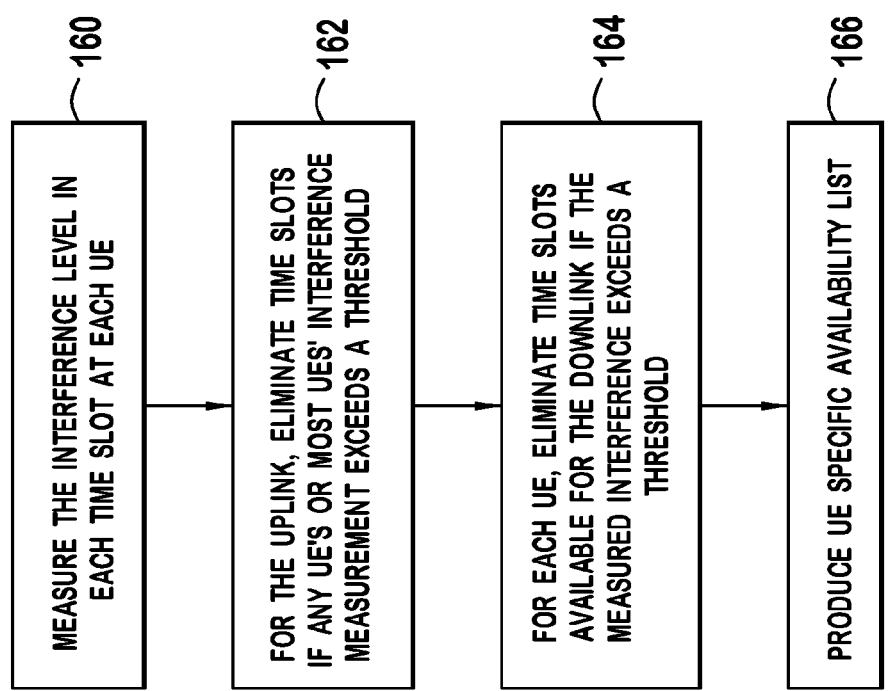
Figure 20:
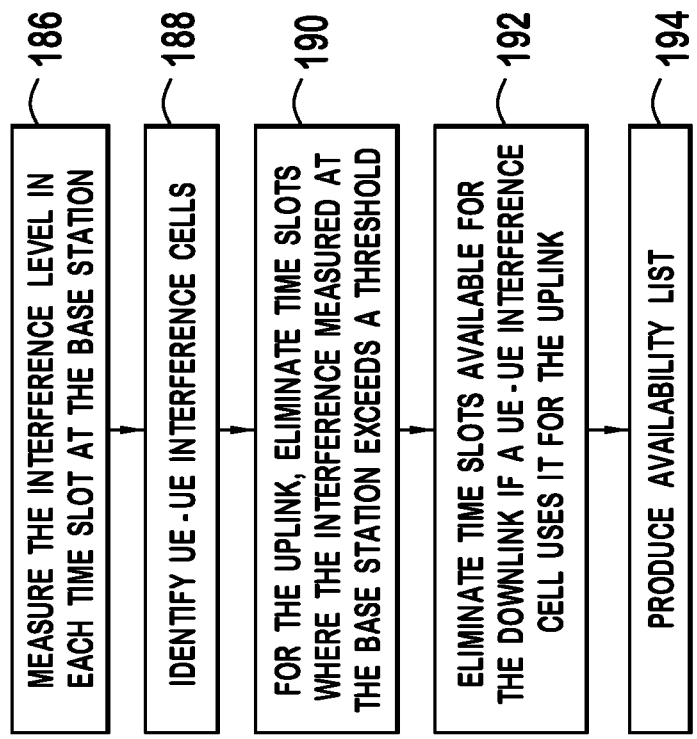
Figure 21:
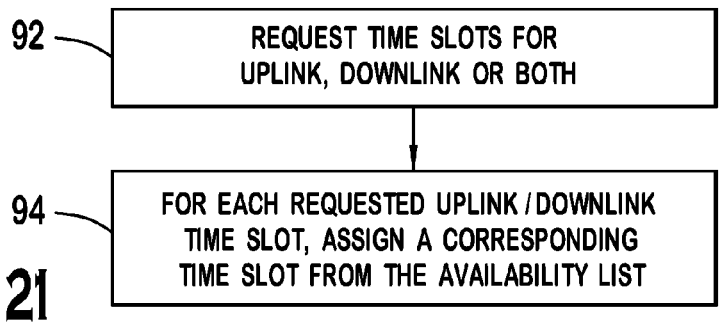
Figure 22:
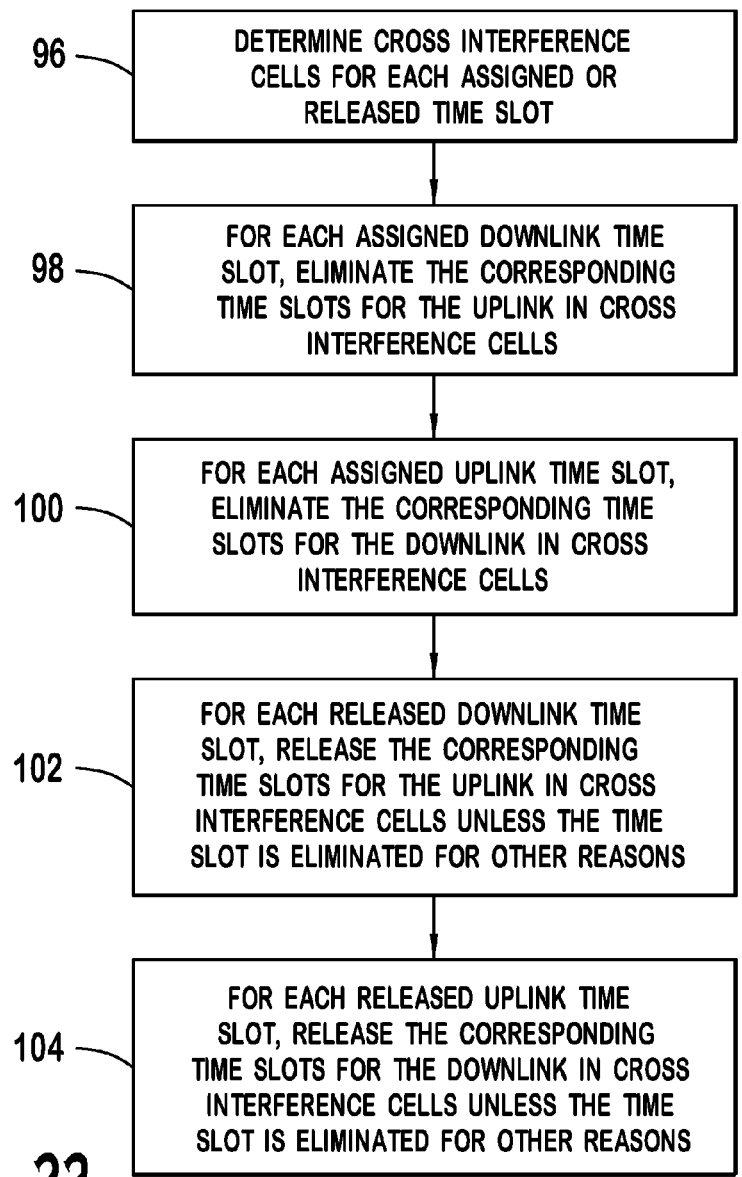
Figure 25:
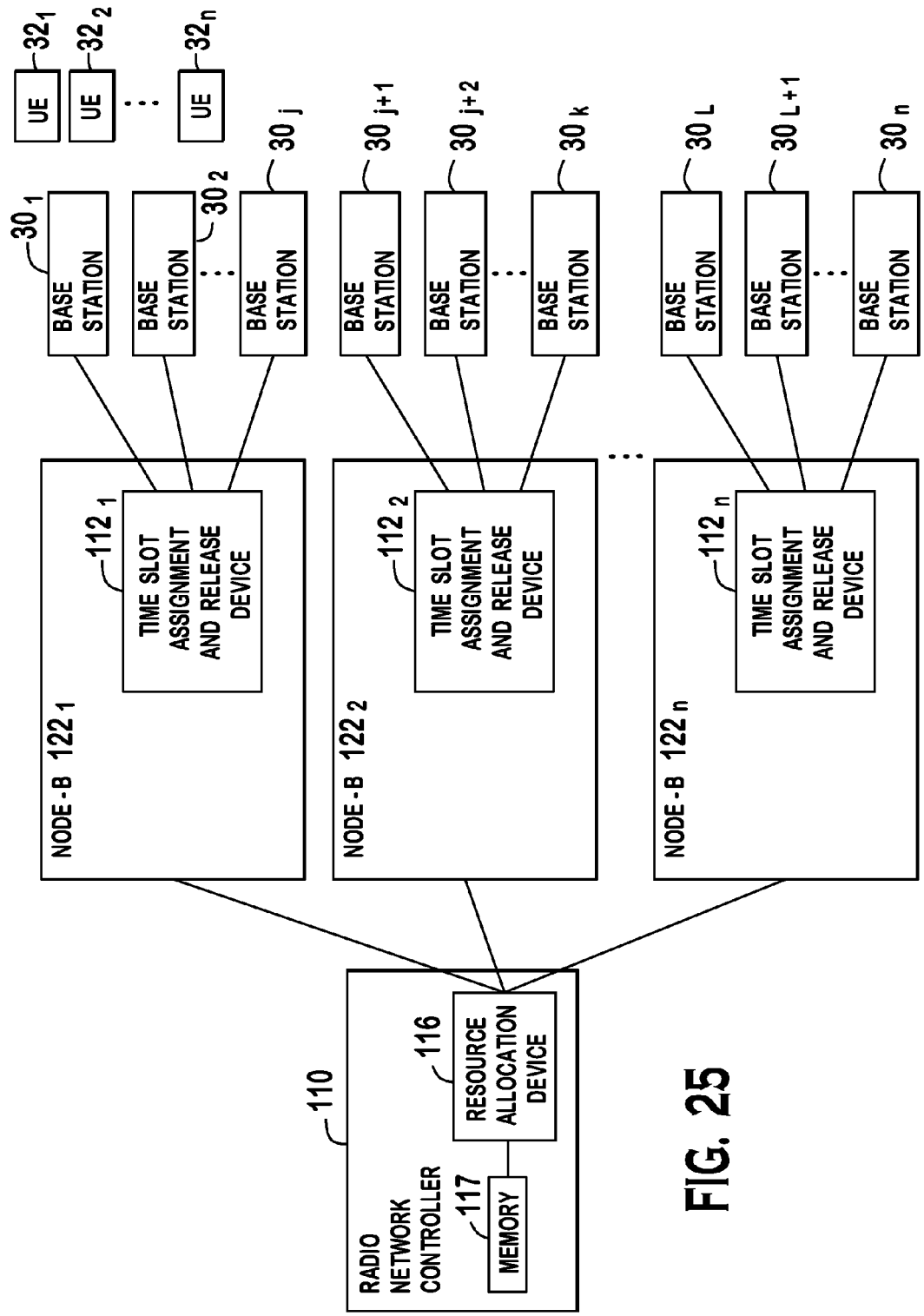
Figure 26:
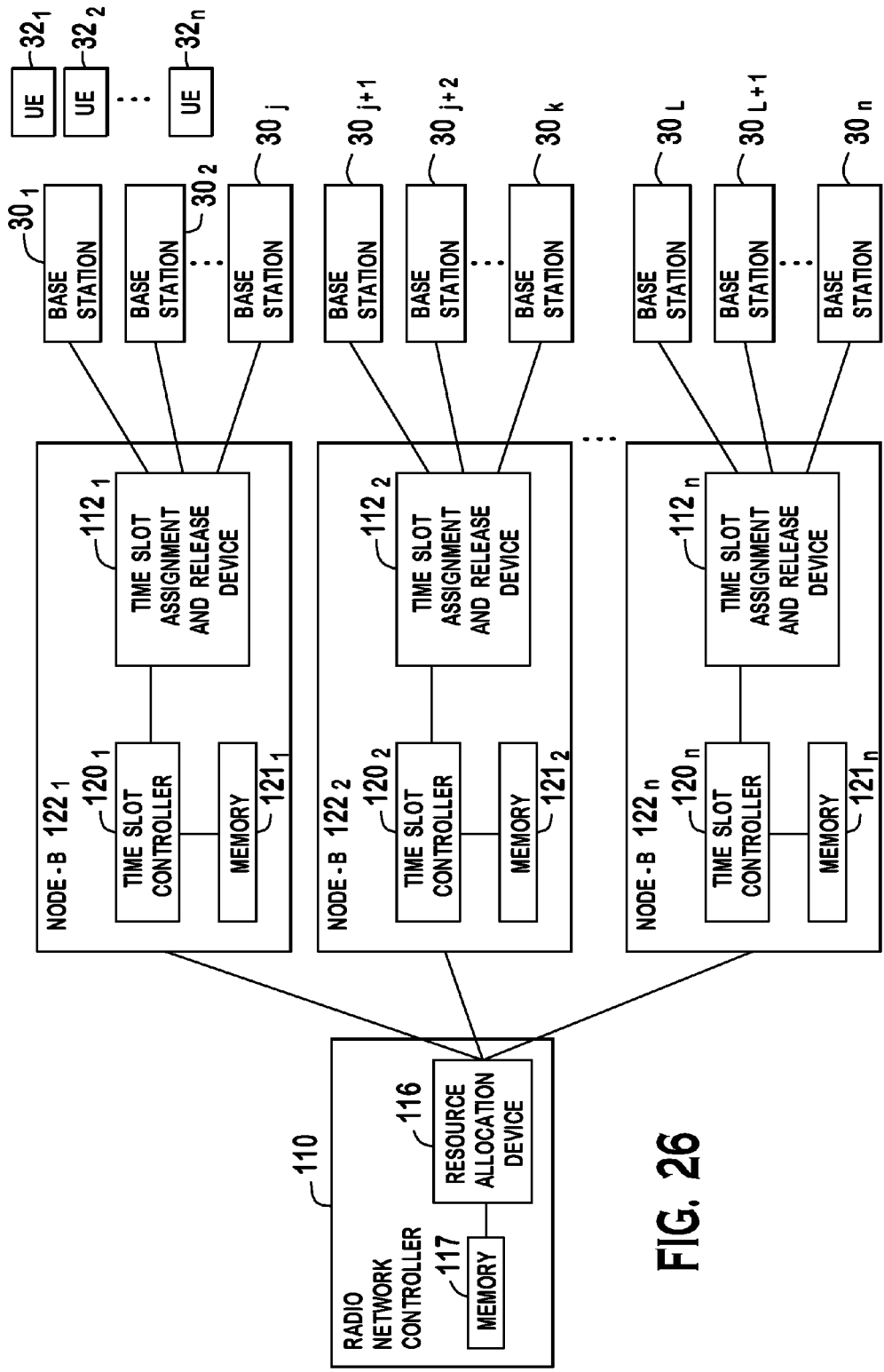

FIG. 1 is a wireless spread spectrum CDMA system.
FIG. 2 illustrates timeslots in repeating frames.
FIG. 3 illustrates cross cell interference.
FIG. 4 is an availability list.
FIG. 5 is a flow chart for generating an availability list using base station to base station (BS-BS) and user equipment to user equipment (UE-UE) interference cells.
FIG. 6 is an example of a cross interference cell list.
FIG. 7 is a table showing a hypothical timeslot allocation for each cell.
FIG. 8 is an availability list for cell 1 constructed using FIGS. 6 and 7.
FIG. 9 is a flow chart for producing an availability list using only BS-BS interference cells.
FIG. 10 is an illustration of a BS-BS cross interference list.
FIG. 11 is a flow chart for producing an availability list using only UE-UE interference cells.
FIG. 12 is a UE-UE cross interference list.
FIGS. 13 and 14 are flow charts using base station and user equipment interference measurement to determine timeslot availability.
FIG. 15 is an illustration of a user equipment specific availability list.
FIGS. 16 and 17 are flow charts for using only interference measurements to determine timeslot availability.
FIGS. 18, 19 and 20 are flow charts for determining timeslot availability using hybrid approaches.
FIG. 21 is a flow chart of a timeslot assignment approach.
FIG. 22 is a flow chart of availability list updating.
FIG. 23 is the updated table of FIG. 7.
FIG. 24 is an updated availability list for cell 7 based on FIG. 23.
FIG. 25 is a centralized architecture embodiment.
FIG. 26 is a decentralized architecture embodiment.

DETAILED DESCRIPTION OF THE PREFERRED EMBODIMENT(S)

Although the following describes timeslot assignment in context of a TDD/CDMA system, the same timeslot elimination procedures and availability lists can be applied to a hybrid TDMA/CDMA system where uplink and downlink communications occur in the same timeslot in a cell.

FIG. 4 illustrates an availability timeslot list 76. Along the horizontal axis, each timeslot is listed as S1, S2, ..., SN. Along the vertical axis, each cell, listed here by the subscript of its associated base station's reference number, is listed for both the uplink and downlink. Each row indicates the timeslot availability for either the uplink or the downlink for a cell. Timeslots not available are indicated with an "X". Available timeslots are left empty.

One procedure for generating the availability list is shown in FIG. 5 and is explained in conjunction with FIGS. 6, 7 and 8. Initially, the cross interference between each cell pair is measured. Initially, base station $30_1$-$30_{11}$ to base station $30_1$-$30_{11}$ (BS-BS) interfering cells are determined, step 77. BS-BS interfering cells are cells where a base station's $30_1$-$30_{11}$ transmissions interfere with another base station's $30_1$-$30_{11}$ reception.

Each cell determines its BS-BS interfering cells by estimating interference from the other cells. One approach estimates the BS-BS interfering cells using pre-measured link gains between the base stations $30_1$-$30_{11}$. If the estimated interference exceeds a threshold, the base stations' cells are considered BS-BS interfering cells, step 77. Based on the threshold comparison, BS-BS interfering cells are determined and stored in a cross interference cell list 84 as illustrated in FIG. 6. The vertical axis of the cross interference cell list 84 has each cell. The horizontal axis has potential cross interfering cells. A cell that BS-BS interferes with another cell is marked in the appropriate box by an "I", step 79. For example, since communications in cell 2 cross interfere with cell 1, the first row, second column box is marked with an "I." Since a cell does not interfere with itself, these boxes are marked by an "X."

Additionally, cells where UEs $32_1$-$32_n$ may interfere with other UEs $32_1$-$32_n$ are determined, step 78. Due to the relatively low EIPR of UEs $32_1$-$32_n$, the UE-UE interfering cells are in close geographic proximity, such as being adjacent. One UE's $32_1$ uplink transmission can interfere with a neighboring cell's UE reception, as shown in FIG. 3. Since cells with close geographic proximity may have UEs $32_1$-$32_n$ which may interfere with each other, these cells are also listed as interfering cells. In FIG. 6, the UE-UE interfering cells which were not BS-BS interfering cells are marked with an "I*", step 79.

Using the cross interference cell list 84, for each cell, the potential cross interference cells are determined, step 78. For a particular cell in the vertical axis, each cell in the corresponding row marked with an "I" or "I*" is a cross interference cell. For instance, cell 1 is potentially cross interfered by cells 2, 3, 5, 6, 9 and 10. For each cross interference cell, the timeslot allocation is determined. For instance, using the hypothetical timeslot allocation of table 86 of FIG. 7, cell 2 is allocated downlink timeslots 1 and 2 and uplink timeslot 9. For each downlink timeslot allocated in a cross interference cell, a corresponding uplink timeslot is eliminated, step 80. To illustrate using FIGS. 6, 7 and 8, for cell 1, cell 2's allocated downlink timeslot 1 eliminates timeslot 1 from cell 1's available uplink timeslots as shown by an "X" in cell 1's availability list 88 of FIG. 8.

For each uplink timeslot allocated in a cross interference cell, a corresponding downlink timeslot is eliminated, step 82. To illustrate for cell 1, cell 2's uplink timeslot 9 eliminates that timeslot from cell 1's possible downlink timeslots as shown in cell 1's availability list 88. After eliminating the appropriate timeslots due to the cross interference cells, an availability list 76 for each cell is produced, step 90. As a result, uplink and downlink timeslots used in cross inference cells are made unavailable reducing cross cell interference.

To relax the assignment conditions, either only the BS-BS interfering cells or only the UE-UE interfering cells are considered. These approaches may lead to freeing up more resources for each cell. However, the looser criteria may result in unacceptable interference levels with respect to some users.

FIG. 9 is a flow chart for producing an availability list using only BS-BS interference cells. The BS-BS interference cells are identified, step 122. A BS-BS cross interference list 132 is produced, such as in FIG. 10. If a cell uses a timeslot for the uplink, that slot is eliminated for use by BS-BS interfering cells for the downlink, step 126. Conversely, if a cell uses a timeslot for the downlink, that slot is eliminated for use by BS-BS interfering cells for the uplink, step 128. A list of available timeslots is produced for each cell, step 130. Although this approach more aggressively uses the system's resources, unacceptable downlink interference may be suffered by some users.

FIG. 11 is a flow chart for producing an availability list using only UE-UE interference cells. The UE-UE interference cells are identified, step 134. A UE-UE cross interference list 142 is produced, such as in FIG. 12. If a cell uses a timeslot for the uplink, that slot is eliminated for use by UE-UE interfering cells for the downlink, step 136. Conversely, if a cell uses a timeslot for the uplink, that slot is eliminated for use by UE-UE interfering cells for the downlink, step 138. A list of available timeslots for each cell is produced, step 140. This approach may result in unacceptable uplink interference levels for some users.

Another approach for determining available timeslots uses interference measurements of timeslots, such as by interference signal code power (ISCP). The interference measurements may be taken at the base stations $30_1$-$30_{11}$, UEs $32_1$-$32_n$ or both.

FIG. 13 is a flow chart using base station and UE interference measurements to determine available timeslots for each UE $32_1$-$32_n$. For a particular cell, the interference level in each timeslot is measured at the base station $30_1$, step 144. Each of the cell's UEs $32_1$, $32_3$-$32_4$ also measure interference levels in each timeslot, step 146. The timeslot interference measurements by the base stations are used to determine the availability of uplink timeslots. The downlink timeslot availability is determined on a UE by UE basis (UE specific basis).

For the uplink, if the base station's measured interference exceeds a threshold in a timeslot, that timeslot is eliminated for the uplink, step 148. For the downlink, each UE $32_1$, $32_3$, $32_4$ eliminates downlink timeslots for its use, if that UE's interference measurement exceeds a threshold, step 150. An availability list 154 is produced showing the available uplink timeslots and the available downlink timeslots for each UE as illustrated in FIG. 15, step 152.

Although two cells are adjacent, the location of specific UEs $32_1$-$32_n$ in the cells may be distant. To illustrate using FIG. 1, cell 1 and cell 2 are adjacent. However, a UE $32_4$ is distant from cell 2. Accordingly, if UE $32_2$ in cell 2 uses a slot for uplink, it will most likely not interfere with the downlink reception of UE $32_4$. However, UE $32_2$ uplink transmissions would likely interfere with UE $32_1$ downlink transmissions. As a result, a more aggressive resource allocation is available using a UE specific availability list 154. One drawback is the increased signaling required. Due to UE mobility and other cells' reassignments, the interference measurements must be updated and signaled to the base station $30_1$-$30_{11}$ on a frequent basis.

FIG. 14 is a flow chart using base station and UE interference measurements to determine non-UE specific available timeslots. The base station $30_1$ measures the interference in each timeslot, step 144, and so does each UE $32_1$, $32_3$, $32_4$, step 146. For the uplink, if the base station measured interference exceeds a threshold in a timeslot, that timeslot is eliminated, step 148. For the downlink, if any of that cell's UEs measured interference in a timeslot exceeds the threshold, that timeslot is eliminated for the downlink, step 156. Using the eliminated timeslots, an availability list 88 for each cell is produced, such as per FIG. 8. Since the UE measurements are effectively combined, missing UE interference measurements are not critical to resource unit assignment.

FIGS. 16 and 17 are flow charts using only UE interference measurements to determine available timeslots. In a cell, each UE measures the interference in each timeslot, step 160. For the uplink, if any UE interference measurement exceeds the threshold, that timeslot is eliminated for the uplink, step 160. Alternately, to reduce the number of eliminated uplink timeslots, only the timeslots where most of the UEs have unacceptable interference are eliminated from the uplink, step 160. If only a few UEs report unacceptable interference, it is assumed these UEs are at the fringe of the cell and are not representative of the overall cell conditions.

Using a UE specific assignment approach as in FIG. 16, each UE $32_1$, $32_3$, $32_4$ has its own set of available downlink timeslots, such as per FIG. 15. For each UE $32_1$, $32_3$, $32_4$, a downlink timeslot is eliminated, if that UE interference measurement on the timeslot exceeds a threshold, step 164. A UE specific availability list 150 is produced, step 166.

A non-UE specific approach is shown in FIG. 17. If any UE or most UEs' interference measurement exceeds a threshold in the timeslot, that timeslot is eliminated for the downlink, step 168. An availability list 88, such as in FIG. 8, is produced for the entire cell.

FIGS. 18, 19 and 20 are timeslot availability determination approaches, using hybrid BS-BS interference, UE-UE interference and interference measurement approaches. FIGS. 18 and 19 use BS-BS interference cells and UE interference measurements. The BS-BS interfering cells are determined, step 172. Each UE $32_1$, $32_3$, $32_4$ measures the interference in each timeslot, step 174. For the uplink, timeslots are eliminated, if a BS-BS interfering cell uses it for the downlink, step 176.

Downlink availability is determined on a UE by UE or a collective basis. Using a UE by UE basis per FIG. 18, each UE $32_1$, $32_3$, $32_4$ compares each timeslot interference measurement to a threshold. If a timeslot measurement exceeds the threshold, that timeslot is eliminated for that UE $32_1$, $32_3$, $32_4$ in the downlink, step 178. A UE specific availability list 150, such as FIG. 15, is produced, step 180.

Using a collective basis per FIG. 19, if any UE timeslot interference measurement exceeds a threshold, that timeslot is eliminated for the downlink for the cell, step 182. An availability list 88, such as FIG. 8, is produced, step 184.

FIG. 20 uses UE-UE interference cells and base station interference measurements. A cell's base station 304 measures the interference levels in each timeslot, step 186. UE-UE interfering cells are identified, step 188. For the uplink, eliminate uplink timeslots, if that timeslot's interference exceeds a threshold, step 190. For the downlink, a downlink timeslot is eliminated, if a UE-UE interfering cell uses it for the uplink, step 192. Based on the eliminated timeslots, an availability list 88, such as FIG. 8, is produced.

For sectored cells, the cross interference list and availability lists 84 are constructed for each sector within the cells. The cross interference between all cell's sectors is determined. Although the following discussion focuses on non-sectorized cells, the same approach also applies to sectorized cells where the assigning is performed on a per sector basis instead of a per cell basis.

Using the availability list 76, each base station $30_1$-$30_n$ is assigned timeslots to support its communications using the procedure of FIG. 21. Initially, a request for an additional allocated timeslot or timeslots is made, step 92. Referring to that base station's availability list 76, corresponding available timeslots are assigned. To illustrate using the availability list 88 of FIG. 8, the base station $30_1$ requires both an additional allocated downlink and an uplink timeslot. The available uplink timeslots are slots 4 and 7-16 and the available downlink timeslots are slots 1-3, 5, 6, 8, 10-13 and 16. One uplink timeslot and downlink timeslot will be assigned out of the corresponding available downlink and uplink timeslots. If a UE specific availability list 150 is used, the downlink assignment is based on the UE $32_1$-$32_n$ requiring the downlink resource unit(s).

Since the base stations $30_1$-$30_n$ need to dynamically assign and release timeslots due to varying uplink/downlink demand, the information in the availability list 76 requires updating. For approaches using interference measurements, the updates are performed by updating the measurements and the lists.

For BS-BS and UE-UE approaches, this procedure is shown in FIG. 22. Initially, the cross interference cells are identified for each assigned or released timeslot, step 96. For each assigned downlink timeslot, the corresponding timeslots in the cross interference cells are eliminated for the uplink, step 98. Conversely, if the uplink timeslot is assigned, the corresponding timeslots in the cross interference cells for the downlink are eliminated, step 100. To illustrate using FIGS. 23 and 24, the base station $30_6$ associated with cell 6 assigns timeslot 7 for the downlink, "D*", and timeslot 8 for the uplink, "U*", as indicated in table 106 of FIG. 23. The cross interference cells are cells 1, 2, 5 and 7. As shown for cell 7's availability list 107 of FIG. 24, timeslot 7 is eliminated for the uplink and timeslot 8 is eliminated for the downlink, both marked as "X*".

If a downlink timeslot was released, the corresponding timeslots in the cross interference cells are freed for the uplink unless unavailable for other reasons, such as being used as a downlink timeslot in another cross interference cell, step 102. For instance, if timeslot 6 of cell 6 is released as indicated in table 106 as "D**", cell 1's uplink timeslot 6 is not made available. Cell 9 is a cross interference cell to cell 1, which also uses downlink timeslot 6. By contrast, for cell 7, the release of downlink timeslot 6 frees the cell for uplink communications as shown in cell 7's availability list 108 by an "R." If an uplink timeslot was released, the corresponding timeslots in the cross interference cells are freed for the downlink unless unavailable for other reasons, step 104.

One approach for using uplink/downlink timeslot assignment is shown in FIG. 25 using a centralized architecture. The radio network controller (RNC) 110 has a resource allocation device 11 to assign or release a timeslot based on user demand. If assigning, the resource allocation device 116 in the RNC 110 assigns an appropriate timeslot using availability list 76, stored in its memory 117, per the procedure of FIG. 21. The selected timeslots and channel codes are communicated to the base station $30_1$-$30_N$ and UEs $32_1$-$32_N$, via the node-B timeslot assignment and release device $112_1$-$112_n$. If releasing a timeslot, the RNC resource allocation device 116 releases that timeslot and updates the availability list 76. Accordingly, updating of the availability list 76 is centralized by occurring at the RNC 110.

Another approach for uplink/downlink timeslot assignment is shown in FIG. 26 using a decentralized architecture. Each node-B $122_1$-$122_N$ has its own timeslot controller $120_1$-$120_n$. When a timeslot assignment and release device $112_1$-$112_n$ requests timeslots for a communication, the node-B's timeslot controller $120_1$-$120_n$ selects an appropriate timeslot from its availability list 76, as stored in its memory $121_1$. The stored availability list 76 to reduce its size may only contain the available timeslots for that node-B's cell(s). Conversely, the stored availability list 76 may contain the availability for all the RNC's cells. The decentralized approach allows for faster updates.

The selected timeslot is assigned to the communication by the timeslot assignment and release device $112_1$-$112_n$. To update the lists 76, that node-B $122_1$-$122_n$ updates its list 76. The assigned and released timeslots are also sent to the RNC 110. The RNC 110 directs the appropriate timeslot update information to the other cells. The timeslot information either contains an updated availability list 76 or merely the changes to the list 76. If only the changes are sent, each cell's controller $120_1$-$120_n$ updates its own availability list 76 with that information. The type of timeslot information sent is based on the processing and signaling requirements of the system.

Assigning uplink/downlink timeslots is adaptable to systems supporting differing signaling rates. For systems supporting only slow network signaling, the allocated timeslot information is updated on a daily basis using a statistical analysis of the uplink/downlink demand. Since communication traffic varies during the day, a faster update rate performs better and is preferred. For medium speed network signaling, the updating is performed periodically ranging from a fraction of an hour to several hours. Medium speed network signaling also uses statistical analysis but over a shorter time period. For fast network signaling, the allocated timeslots are updated on a per call basis or frame basis. Once a timeslot is assigned or released, the appropriate lists are updated. The fast network signaling allocates timeslots on an as needed basis. As a result, it more efficiently uses the system's resources.

What is claimed is:

1. A wireless network device comprising:
a resource assignment processor configured to determine an uplink interference associated with each of a plurality of uplink resources and produce an uplink list having one of a plurality of values for each of the plurality of uplink resources;
the resource assignment processor further configured to compare a downlink power level to a threshold for each of a plurality of downlink resources and produce a downlink list, wherein the downlink list is a bit string providing at least one indication for each of the downlink resources, wherein each indication indicates whether the downlink power level for each downlink resource is less than or equal to the threshold;
a transceiver operatively coupled to the resource assignment processor, the transceiver configured to send the uplink list and the downlink list;
the transceiver further configured to receive an uplink list and a downlink list from each of a plurality of neighboring wireless network devices; and
the resource assignment processor further configured to schedule uplink and downlink resources to a user equipment based on the received uplink list and the received downlink list.

2. The wireless network device of claim 1 wherein the uplink and downlink resources are time slots.

3. The wireless network device of claim 1 wherein the scheduling downlink resources includes scheduling a transmission to a user equipment using at least one downlink resource on a condition that an indication, in the received downlink list, for the at least one downlink resource indicates that a downlink power level for the at least one downlink resource is less than or equal to a threshold.

4. The wireless network device of claim 1 further comprising the resources assignment processor further configured to schedule resources using a decentralized architecture.

5. The wireless network device of claim 1 wherein the wireless network device is a Node B.

6. The wireless network device of claim 1 wherein each one of plurality of values for each of the plurality of uplink resources is determined based on a threshold comparison.

7. A method comprising:
determining, by a wireless network device, an uplink interference associated with each of a plurality of uplink resources;
producing, by the wireless network device, an uplink list having one of a plurality of values for each of the plurality of uplink resources;
comparing, by the wireless network device, a downlink power level to a threshold for each of a plurality of downlink resources;
producing, by the wireless network device, a downlink list, wherein the downlink list is a bit string providing at least one indication for each of the downlink resources, wherein each indication indicates whether the downlink power level for each downlink resource is less than or equal to the threshold;
sending, by the wireless network device, the uplink list and the downlink list;
receiving, by the wireless network device, an uplink list and a downlink list from each of a plurality of neighboring wireless network devices; and
scheduling, by the wireless network device, available uplink and downlink resources to a user equipment based on the received uplink list and the received downlink list.

8. The method of claim 7 wherein the uplink and downlink resources are time slots.

9. The method of claim 7 wherein the scheduling downlink resources includes scheduling a transmission to a user equipment using at least one downlink resource on a condition that an indication, in the received downlink list, for the at least one downlink resource indicates that a downlink power level for the at least one downlink resource is less than or equal to a threshold.

10. The method of claim 7 further comprising scheduling, by the wireless network device, resources using a decentralized architecture.

11. The method of claim 7 wherein the wireless network device is a Node B.

12. The method of claim 7 wherein each one of plurality of values for each of the plurality of uplink resources is determined based on a threshold comparison.

* * * * *